Sept. 16, 1969     H. P. MEHR     3,467,312
EJECTOR NOZZLE
Filed Feb. 10, 1966
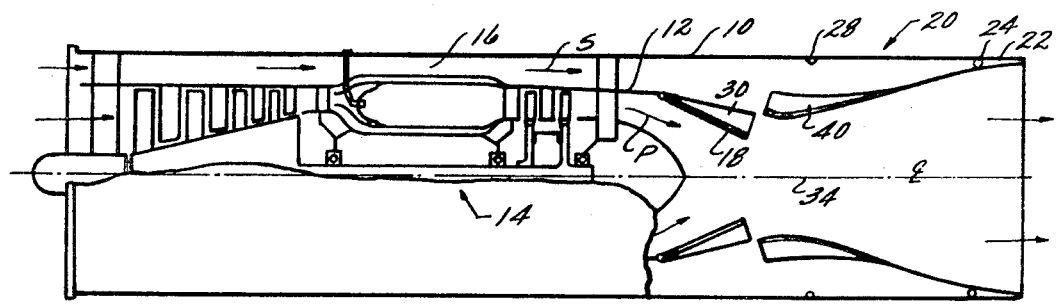
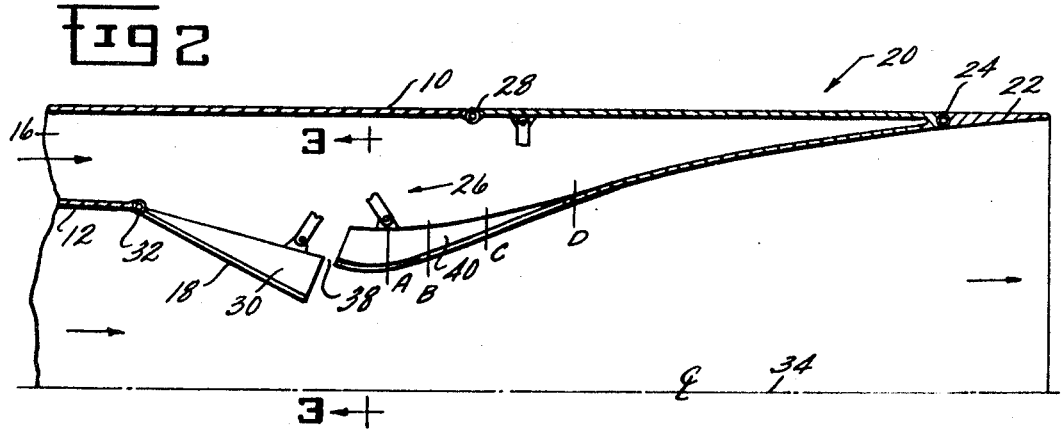
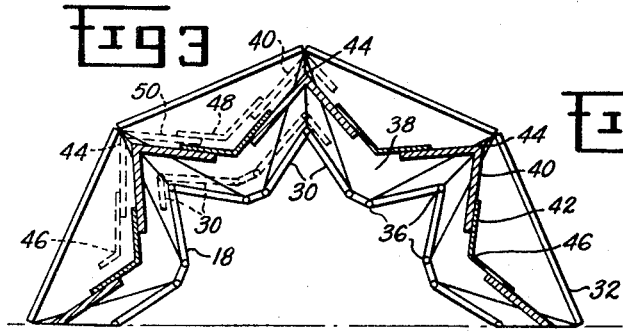
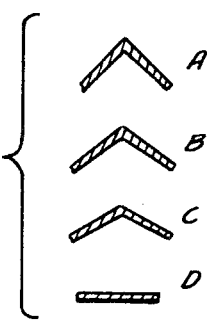
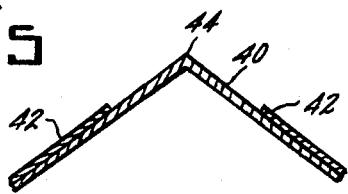
INVENTOR.
HANS P. MEHR
BY
ATTORNEY

United States Patent Office 3,467,312
Patented Sept. 16, 1969

3,467,312
EJECTOR NOZZLE
Hans P. Mehr, Mason, Ohio, assignor to General Electric
Company, a corporation of New York
Filed Feb. 10, 1966, Ser. No. 526,560
Int. Cl. B64d *33/04;* B05b *15/00;* B63h *11/10*
U.S. Cl. 239—127.3                                    8 Claims

ABSTRACT OF THE DISCLOSURE

A supersonic ejector nozzle includes a primary nozzle having a star-shaped exit area and a secondary nozzle having a star-shaped entrance area and a substantially circular exit area, the convoluted exit of the primary nozzle and the convoluted entrance of the secondary nozzle cooperating to form an annulus for the flow therethrough of secondary ejector cooling air.

---

The invention described and claimed in the United States patent application herein resulted from work done under United States Government contract FA–SS–65–17. The United States Government has an irrevocable, non-exclusive license under said application to practice and have practiced the invention claimed herein, including the unlimited right to sublicense others to practice and have practiced the claimed invention for any purpose whatsoever.

The present invention relates to an ejector nozzle and, more particularly, to a supersonic convoluted ejector nozzle for a reaction engine.

In present generation high Mach engines large nozzle variation is required in order to handle the expansion that occurs at supersonic velocity. This has necessitated nozzles of the long variable finger type with rugged actuation systems for operating the nozzle efficiently under pressures present at both subsonic and supersonic velocities. Additionally, it is desired that the engine have some sound suppression as well as means for thrust reversal. Further, the engine must be adequately cooled both on the ground and at high velocities. For this purpose, the so-called ejector nozzle has been designed which is merely a nozzle for injecting cooling flow over the engine. Normally, this flow comes through the aircraft inlet and then passes over the engine to the nozzle. However, during ground operation and low Mach number flight conditions, due to inlet losses, the pressure is reduced substantially by the time it gets to the compressor requiring the nozzle to pump from a pressure significantly lower than ambient pressure. This has proven difficult and, to overcome the difficulty at these conditions, air is bled in near the compressor exit through openings in the side of the nacelle in order to have the ejector easily pump from a point close to the ejector structure in a satisfactory and efficient manner as disclosed in co-pending application, Ser. No. 526,420 filed Feb. 10, 1966, now Patent 3,409,228 issued Nov. 5, 1968, filed of even date by the same inventor and assigned to the same assignee.

As noted above, in some applications it is desired to use thrust reverser mechanism and this is required whether a central plug is used or not. This has led to the use of a star-shaped primary or convoluted primary nozzle so that it may also be used as a blocker in thrust reverser operation. The convoluted flaps may be hinged along a longitudinal centerline to open fan-like when moved into a blocker position. Additionally, the convolute shape has provided some sound suppression by reason of the large peripheral area of flow through the nozzle. Both of these functions are required in supersonic nozzles for high Mach aircraft. In such nozzles, a convergent-divergent nozzle is required to control expansion as is well known. The difficulty with the use of the convoluted primary nozzle is that it is normally used with a standard shaped secondary nozzle and there is a performance penalty in uneven distribution of the secondary cooling flow. As a result, higher values of cooling flows are required and this lowers the engine performance.

The main object of the present invention is to provide a supersonic ejector nozzle that uses a convoluted primary nozzle and a convoluted matching secondary nozzle to provide for even distribution of secondary cooling flow and uniform expansion of primary flow.

Another object is to provide such a nozzle which maintains a substantially constant annulus for positive control of the secondary airflow for cooling purposes.

A further object is to provide such a nozzle in which the expansion of the primary flow is evenly distributed around the nozzle.

A further object is to provide such a nozzle wherein the convoluted entrance to the secondary portion is fixed in shape and the exit convoluted area of the primary is variable both in shape and area.

A final object is to provide such a nozzle wherein the primary convoluted portion is converging and the secondary diverging portion has a convoluted entrance that fairs into a smooth exit.

Briefly stated, there is provided a supersonic ejector nozzle for a jet engine which has spaced outer and inner casings to define a secondary airflow cooling passage around the engine. A primary nozzle is provided which many conveniently be a plurality of primary nozzle flaps pivoted to the inner casing to form a variable area converging nozzle for the primary gas flow and the primary flaps have a convoluted exit shape. There is provided a plurality of secondary nozzle flaps pivoted to the outer casing and forming a diverging nozzle, the secondary flaps being disposed downstream and outwardly of the primary flaps to form an annulus for secondary ejector flow through the cooling passage and into the primary flow. The secondary flaps are formed to have a convoluted entrance shape corresponding substantially to the exit shape of the primary flaps and the convoluted secondary flaps fair into a smooth or non-convoluted shape downstream to the exit of the nozzle or secondary flaps. The general convoluted shape may conveniently be triangular. For variable area operation and thrust reverser operation, the primary flaps may be hinged together along a longtitudinal centerline to vary the convoluted exit shape and area whereas the secondary matching convoluted shape is preferably fixed.

While the specification concludes with claims particularly pointing out and distinctly claiming the subject matter which is regarded as the invention, it is believed the invention will be better understood from the following description taken in connection with the accompanying drawing.

The invention will be described in connection with a jet engine for ease of illustration. However, it is applicable to many kinds of reaction engines having a gaseous exhaust for propulsion. It will also be apparent that the exhaust nozzles may be variable or fixed throat and exit area types.

FIGURE 1 is a general diagrammatic view of a typical gas turbine engine to which the invention may be applied;

FIGURE 2 is a partial cross sectional view of the ejector nozzle structure in the high Mach position;

FIGURE 3 is a partial cross sectional view on the line 3—3 of FIGURE 2;

FIGURE 4 illustrates the cross sections of the convoluted secondary flap at the stations indicated; and FIGURE 5 is a partial cross sectional view of a typical seal means on the secondary convoluted nozzle.

Referring first to FIGURE 1, there is shown a general diagrammatic view of a jet engine powerplant which comprises an outer casing 10 and spaced from the outer casing is an inner casing 12 which houses a jet engine 14 of any conventional type. The spacing of the outer and inner casings 10 and 12 forms a cooling passage 16 around engine 14. This cooling passage is provided for the pumping of air around the engine to cool the inner engine 14 at supersonic operation as well as on the ground. In order to obtain thrust, nozzle 18 is provided on the engine and it may be a fixed nozzle or it may consist of a plurality of peripherally disposed primary nozzle flaps that are pivotally connected to the inner casing at the downstream end as shown. Such structure is conventional and operates in the normal fashion. In order to provide controlled expansion at supersonic velocities, it is necessary to provide a convergent-divergent nozzle and to this end, variable secondary flaps generally indicated at 20 that are well-known may be provided. A nozzle as thus far described, and means for operating the nozzle, is generally shown in U.S. Patent 3,214,904 and of common assignment. The downstream end of secondary flaps 20 may be provided with free floating flaps 22 pivoted at 24. These latter flaps, due to the pressure differential, will float in the position required for the particular operating conditions. The whole secondary portion of the nozzle formed by secondary flaps 20 is actuated by suitable linkage, generally indicated at 26, and more completely shown in the aforementioned patent, so that the secondary flaps are pivoted about pivot 28 as operated and positioned by the linkage to change the nozzle configuration as required by the operating conditions.

As noted above, nozzle 18 is the primary nozzle. In order to permit this nozzle, where required, to perform multiple functions, it may be conveniently made up of a plurality of primary nozzle flaps 30 as shown in FIGURE 2. Preferably, for area variation, flaps 30 are pivoted at 22 to inner casing 12 for rotation about the pivot point to open and close the primary flaps. As will be seen, this forms a converging nozzle for the primary gas flow P. In order for the nozzle to perform a thrust reversal function it is conveniently formed of a star-shaped or convoluted exit shape as seen in FIGURE 3. The convoluted exit shape may be seen to be formed of triangular convolutions which are convenient for the purpose to be described. Blockage is required in thrust reversal position to direct the primary flow out of the engine through structure not shown and primary flaps 30 are designed to unfold and open down to centerline 34 to substantially block the primary flow. As seen in FIGURE 3, the convoluted exit shape of the primary nozzle flaps lends itself to the provision of a longitudinal hinge means 36 which permits the individual flaps to unfold outwardly as they are rotated towards the centerline in a fan-like fashion. Furthermore, the convoluted exit shape provides some sound suppression effect because of the large nozzle periphery of the primary gas flow and the penetration of the flaps into the primary stream. Thus, actuation of the primary nozzle flaps 30 varies both the triangular convoluted exit shape as well as the area as will be apparent. Normal nozzle structure at this point uses a standard shaped secondary nozzle 20 generally of circular configuration. The disadvantage of such a nozzle is that there is a performance penalty associated with the convoluted primary nozzle because of the non-uniform annulus 38 formed between the convoluted primary and circular secondary nozzle flaps and through which the secondary airflow S is pumped by the ejector action. This airflow is required to provide cooling flow over the engine as well as bathing the inner surface of the secondary flaps 20 with a film of cool air. Also, it will be apparent that uneven expansion from the primary to the secondary will occur because of the uneven annulus between the two.

It is desired to provide an even distribution of secondary flow and an even expansion of the primary gas flow. To this end in accordance with the invention, each secondary nozzle flap 20 is provided with a forward portion 40 that forms a convoluted entrance shape to the secondary nozzle. The convoluted entrance shape corresponds substantially to the convoluted exit shape of the primary nozzle as clearly seen in FIGURE 3. Conveniently, each entrance and exit convoluted shape is made triangular as shown although other shape convolutions may be used. By making the secondary flaps with a convoluted entrance, it can be seen in FIGURE 3 that the annulus 38 between the flaps is substantially constant throughout. This annulus for the passage of secondary ejector flow of cooling fluid S into the primary flow P results in an even distribution of the seconary flow. Additionally, the dual convoluted adjacent configurations provide for an even expansion of the primary flow inasmuch as the distance from the trailing edge of the primary flaps to the leading edge of the secondary flaps is substantially constant throughout the nozzle periphery.

Since the secondary flaps, in moving about pivot 28 to form the diverging portion of the overall nozzle, need only the forward portion 40 convoluted, the secondary nozzle is designed to fair into a smooth non-convoluted shape downstream to the exit of the secondary flaps which would be at the exit plane of floating flaps 22. In other words, the convoluted entrance to the secondary flaps gradually changes shape to fair into a smooth, normally round, exit nozzle. This gradual change in cross sectional shape is shown in FIGURE 4 for the various stations A-D shown at the corresponding lines in FIGURE 2. It will be apparent that movement of the secondary flaps requires a change in the convoluted entrance area to the secondary flaps. This is provided by the structure illustrated in FIGURE 5 which includes a sealing means 42 which may take any suitable shape to permit the forward flap portions 40 to move away from one another along their respective planes as shown in FIGURE 5. Thus, the convolute cross sectional shape of the entrance to the secondary flaps is maintained fixed but the cross sectional area is changed by reason of the flap movement along the seal 42. Of course, this seal may be provided either at the peaks 44 or valleys 46 or both or in between of the secondary flaps.

In reheat operation it may be necessary to open the nozzle father and the position of the convoluted exit and entrance is partially shown in the dotted portions 48 and 50 respectively in FIGURE 3. Because of the fixed shape of the secondary convoluted entrance to the secondary flaps at 40, there will be a slight change in the annulus since the primary flaps are hinged as noted above and their convoluted shape is varied as well as the area. However, it will be apparent that the annulus between the dotted positions is again substantially constant to provide for an even distribution of secondary flow and an even expansion of the primary flow between the two nozzles. The provision of the dual-convoluted nozzle avoids the uneven distribution of the secondary cooling flow and thereby provides a substantially constant cooling flow and high efficiency. This, in turn, increases the engine performance. Further, the nozzle, by providing the substantially constant annulus provides even expansion of the primary flow to avoid any performance penalty in nozzle operation. This is obtained with a configuration that permits complete blockage for thrust reversal of the primary flow as well as a configuration that provides for some sound suppression.

While there has been described a preferred form of the invention, obvious equivalent variations are possible in light of the above teachings. It is therefore to be understood that within the scope of the appended claims, the invention may be practiced otherwise than as specifically described, and the claims are intended to cover such equivalent variations.

I claim:
1. A supersonic ejector nozzle for a reaction engine having spaced outer and inner casings forming a cooling passage around the engine,
   a primary converging member connected to the inner casing to form a nozzle for the primary gas flow,
   said converging member having a star-shaped exit,
   a secondary diverging member connected to the outer casing downstream and outwardly of said converging member, and
   said diverging member star-shaped entrance shape corresponding substantially to said exit shape.

2. A supersonic ejector nozzle for a jet engine having spaced outer and inner casings forming a secondary airflow cooling passage around the engine,
   a plurality of primary nozzle flaps pivoted to the inner casing to form a variable area converging nozzle for the primary gas flow,
   said converging nozzle having star-shaped exit,
   a plurality of secondary nozzle flaps pivoted to the outer casing and forming a diverging nozzle,
   said secondary flaps being disposed downstream and outward of said primary flaps to form therewith an annulus for secondary ejector flow into said primary flow, and
   said diverging nozzle having a star-shaped entrance corresponding substantially to said exit shape.

3. Apparatus as described in claim 2 having sealing means between adjacent ones of a set of secondary flaps to permit the entrance area to be varied while maintaining the convolute shape.

4. A supersonic ejector nozzle for a reaction engine having spaced outer and inner casings forming a cooling passage around the engine,
   a primary converging member connected to the inner casing to form a nozzle for the primary gas flow,
   said converging member having a star-shaped exit and being formed of primary flaps hinged along longitudinal lines to permit the shape and exit area of said converging member to be varied,
   a secondary diverging member formed of secondary flaps connected to the outer casing downstream and outwardly of said converging member, and
   said diverging member having a star-shaped entrance of fixed shape corresponding substantially to the nominal exit shape of said converging member.

5. Apparatus as described in claim 4 wherein said secondary convoluted shape fairs into a smooth non-convoluted shape downstream.

6. Apparatus as described in claim 4 having sealing means between some of the convolutions of the secondary flaps disposed for said flaps to vary the exit area.

7. A supersonic ejector nozzle for a jet engine having spaced outer and inner casings forming a secondary air flow cooling passage around the engine,
   a plurality of primary nozzle flaps pivoted to the inner casing to form a variable area converging nozzle for the primary gas flow,
   said converging nozzle having a star-shaped exit and said primary flaps being hinged together along longitudinal lines to permit variance of the star-shaped exit shape end area,
   a plurality of secondary nozzle flaps pivoted to the outer casing and forming a diverging nozzle,
   said secondary flaps being disposed downstream and outward of said primary flaps to form therewith an annulus for secondary ejector flow into said primary flow, and
   said diverging nozzle having a star-shaped entrance of fixed shape corresponding substantially to the nominal shape of said exit.

8. A supersonic ejector nozzle for a jet engine having spaced outer and inner casings forming a secondary air flow cooling passage around the engine,
   a plurality of primary nozzle flaps pivoted to the inner casing to form a variable area converging nozzle for the primary gas flow,
   said converging nozzle having a star-shaped exit,
   a plurality of secondary nozzle flaps pivoted to the outer casing to form a diverging nozzle,
   said secondary flaps being disposed downstream and outward of said primary flaps to form therewith an annulus for secondary ejector flow into said primary flow, and
   said diverging nozzle having a star-shaped entrance corresponding substantially to said exit shape and a smooth nonconvoluted shape downstream of said entrance.

References Cited

UNITED STATES PATENTS

| | | | |
|---|---|---|---|
| 2,874,538 | 2/1959 | Laucher et al. | 239—127.3 |
| 2,914,914 | 12/1959 | Vandenberg | 239—265,41 |
| 2,926,491 | 3/1960 | Hyde | 239—265.41 |
| 2,984,068 | 5/1961 | Eatock | 239—127.3 |
| 2,995,010 | 8/1961 | Arscott | 239—127.3 |
| 2,886,946 | 5/1959 | Parker | 239—127.3 |
| 2,997,845 | 8/1961 | Oulianoff | 239—127.3 |
| 3,027,714 | 4/1962 | Parker | 239—127.3 |
| 3,032,974 | 5/1962 | Meyer | 239—127.3 |
| 3,214,904 | 11/1965 | Bailey et al. | 239—265.41 |

FOREIGN PATENTS 936,044   9/1963   Great Britain.

EVERETT W. KIRBY, Primary Examiner

U.S. Cl. X.R.

239—132.5, 265.11, 265.19, 265.41